United States Patent
Hsu

[19]

[11] Patent Number: 5,873,171
[45] Date of Patent: Feb. 23, 1999

[54] RULER ASSEMBLY

[76] Inventor: Nick Hsu, 17th Fl.-3, No. 424, Chungming Rd., Taichung, Taiwan

[21] Appl. No.: 901,366

[22] Filed: Jul. 28, 1997

[51] Int. Cl.[6] .............................. G01B 3/02; B43L 7/00; B43L 13/00
[52] U.S. Cl. .................. 33/484; 33/488; 33/456
[58] Field of Search .................. 33/456, 458, 459, 33/465, 483, 484, 485, 486, 487, 488, 491, 492, 495

[56] References Cited

U.S. PATENT DOCUMENTS

| | | | |
|---|---|---|---|
| 566,195 | 8/1896 | Leavitt | 33/485 |
| 569,358 | 10/1896 | Sommerfeldt | 33/491 |
| 581,171 | 4/1897 | Nevin | 33/485 |
| 588,852 | 8/1897 | Beatty | 33/458 |
| 892,780 | 7/1908 | Vaughn | 33/485 |
| 1,179,142 | 4/1916 | Shaughnessy | 33/488 |
| 2,382,618 | 8/1945 | Douglass | 33/456 |
| 2,736,097 | 2/1956 | Coleman, Jr. | 33/488 |
| 3,308,543 | 3/1967 | Fenton | 33/458 |
| 3,503,130 | 3/1970 | Ferguson | 33/458 |
| 4,316,330 | 2/1982 | Hayes | 33/488 |

*Primary Examiner*—G. Bradley Bennett
*Attorney, Agent, or Firm*—Holland & Hart LLP

[57] ABSTRACT

A ruler assembly includes a ruler to which a connecting member is pivotably connected and a magnifying member is pivotally connected to the connecting member so as to have a series of graduations defined on the ruler magnified through the magnifying member when the magnifying member is located in parallel to the ruler.

4 Claims, 3 Drawing Sheets

RULER ASSEMBLY

BACKGROUND OF THE INVENTION

1. Field of the Invention

The present invention relates to a ruler assembly and, more particularly, to a ruler assembly having a ruler to which a supporting plate and a magnifying member are foldably disposed thereto.

2. Brief Description of the Prior Art

A ruler is used to mark an object, for example a wooden board, at a desired point so that a user, a carpenter for example, can precisely cut or saw the wooden board into sectors with an identical length. A conventional ruler has two longitudinal sides and at least one of two sides thereof has marks thereon so that a user may mark an object at a certain length according to the graduations on the ruler. However, the graduations on the ruler are very close to each other so that it is difficult to mark an object precisely.

The present invention intends to provide a ruler assembly which has a magnifying member connected to the ruler so as to mitigate and/or obviate the above-mentioned problems.

SUMMARY OF THE INVENTION

The present invention provides a ruler assembly which includes a ruler, a connecting member pivotally connected to the ruler and a magnifying member pivotally connected to the connecting member. The ruler has an upper surface to which two clamping means are disposed and two longitudinal sides, at least one of two longitudinal sides of the ruler having at least one series of graduations defined thereon.

The connecting member has a first long edge and a second long edge, said first long edge having two openings defined close thereto and each of the openings being partly defined by one of a pair of rods forming a portion of the first long edge, said rods being pivotably received in the two clamping means. The second long edge of the connecting member has at least one first curved lug and at least one second curved lug extending oppositely therefrom so as to receive a pivot connected to one of two sides of the magnifying member. A slot is defined in the magnifying member and located next to the pivot so that the second curved is able to lug extend through the slot.

It is an object of the present invention to provide a ruler assembly having a magnifying member so as to provide magnification of the series of graduations defined on the ruler.

It is another object of the present invention to provide a ruler assembly which can be folded to be of a compact size.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
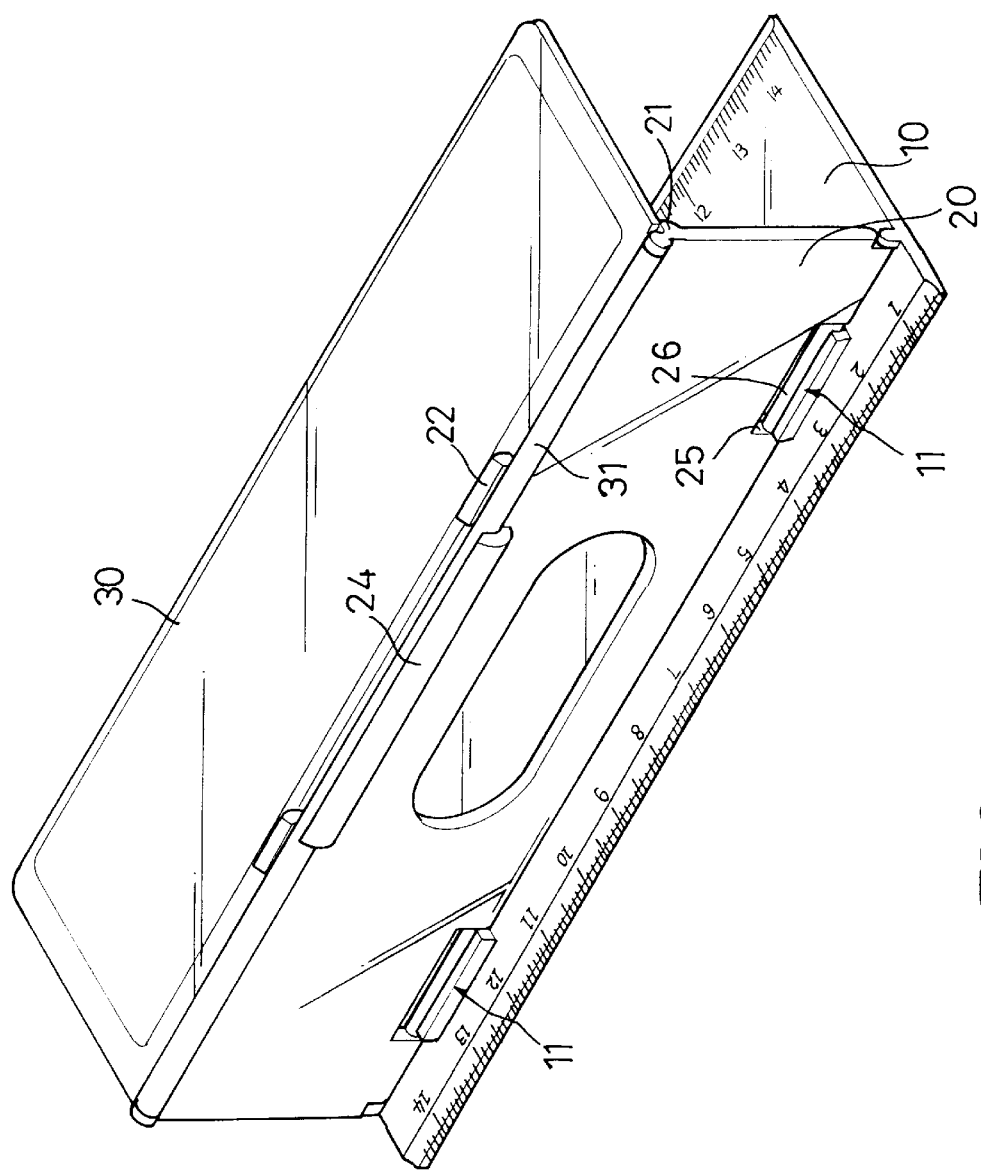
FIG. 1 is a perspective view of a ruler assembly in accordance with the present invention.
Figure 2:
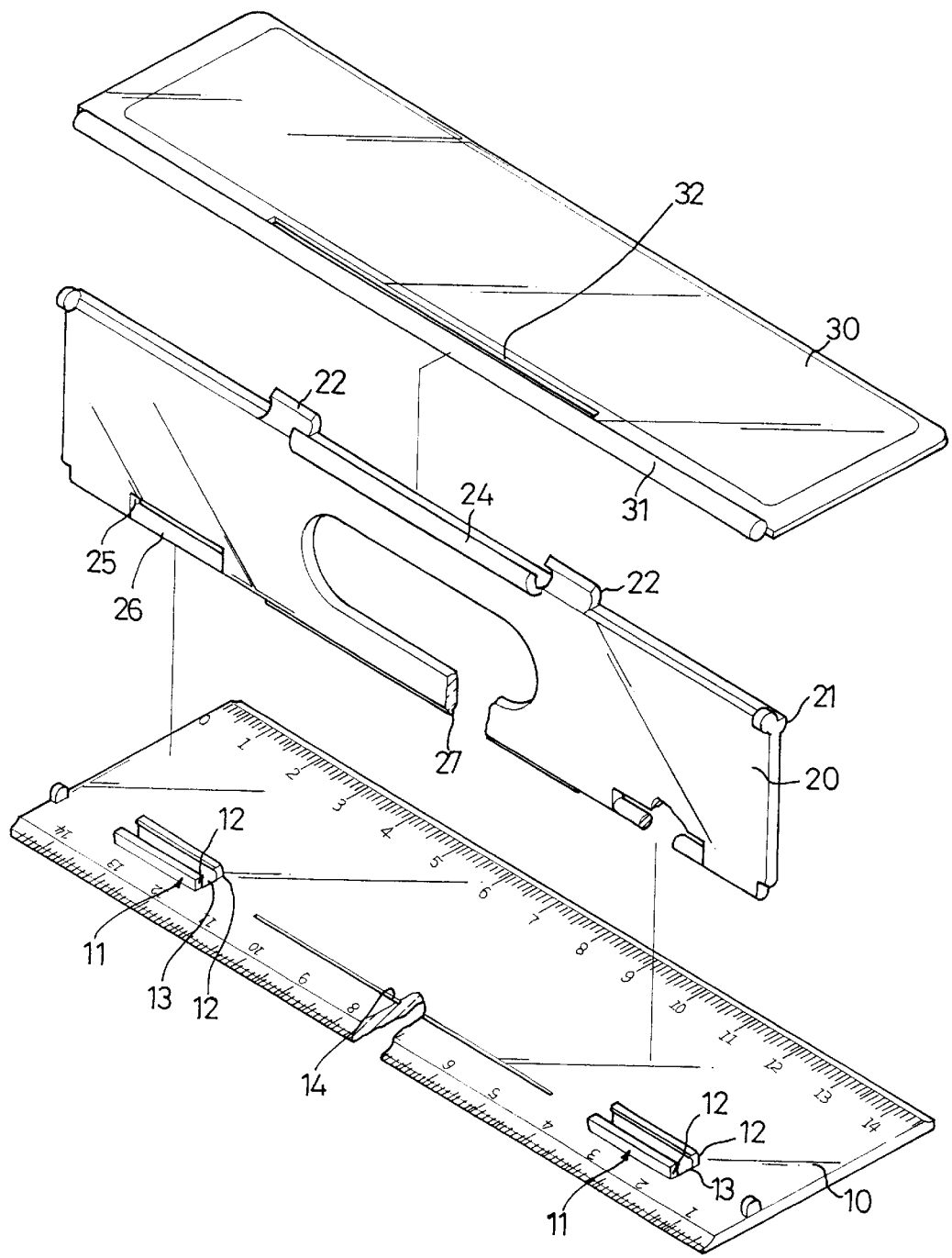
FIG. 2 is an exploded view of the ruler assembly in accordance with the present invention.
Figure 3:
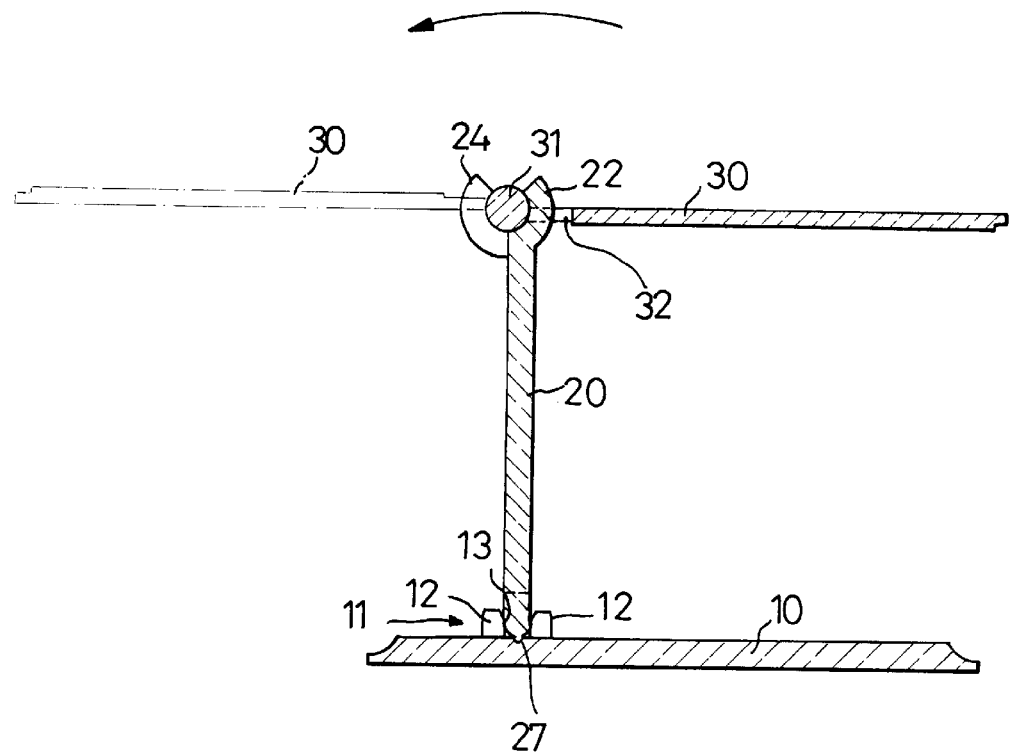
FIG. 3 is a side elevational view, partly in section, of the ruler assembly when the magnifying member is positioned in parallel to the ruler.

Referring to the drawings and initially to FIGS. 1 through 3, a ruler assembly in accordance with the present invention generally includes a ruler 10, a connecting member 20 connected to the ruler 10 and a magnifying member 30 connecting to the connecting member 20. The ruler 10 has two longitudinal sides and at least one of the two longitudinal sides of the ruler 10 has at least one series of graduations defined thereon. An upper surface of the ruler 10 has two clamping means 11 disposed thereon. Each clamping means 11 includes two ridges 12 extending from the upper surface in parallel with each other so as to define a receiving passage 13 therebetween. The ruler 10 has a groove 14 defined in the upper surface thereof.

The connecting member 20 includes a first long edge and a second long edge opposed to the first long edge. Two openings 25 are defined near the first long edge and are set apart a distance equal to the distance between the two clamping means 11. Each of the openings 25 is partly defined by respective portion of the first long edge and each said portions being formed as a rod 26 pivotably received in a respective one of the two clamping means 11. A flange 27 extends from the first long edge of the connecting member 20 so as to be disengagably received in the groove 14. The second long edge of the connecting member 20 has a first curved lug 24 and two second curved lugs 22 respectively extending therefrom in a direction opposite to the first curved lug 24. The second curved lugs 22 are respectively formed at two ends of the first lug 24. A supporting flange 21 extends laterally from the second long edge of the connecting member 20.

The magnifying member 30 has a pivot 31 connected to one of two long sides thereof and a slot 32 defined therein located next to the pivot 31. The pivot 31 is pivotally received between the first curved lug 24 and the second curved lugs 22. Distal tips of the first curved lug 24 and the second curved lugs 22 extend through the slot 32 to enable the magnifying member 30 to pivot fully. When said magnifying member 30 is pivoted in perpendicular to the connecting member 20, the magnifying member 30 is supported by the supporting flange 21. Therefore, the graduations defined on the ruler 10 are magnified through the magnifying member 30.

Figure 4:
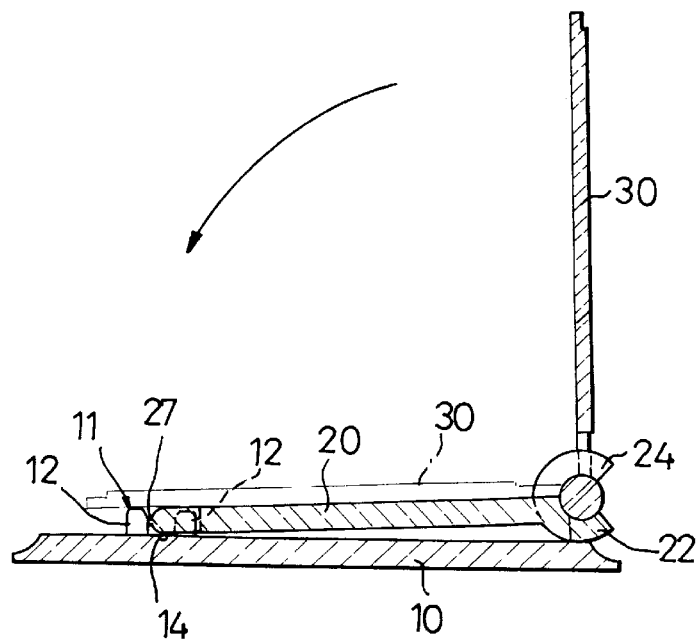
FIG. 4 is a side elevational view, partly in section, of the ruler assembly when if is folded.

Referring to FIG. 4, the magnifying member 30 can be pivoted about an axis of the pivot 31 whereby the first lug 24 is received in the slot 32. The connecting member 20 is pivoted about the first long edge thereof to let the connecting member 20 lay on the ruler 10 wherein a gap defined between the rod 26 and the periphery defining the opening 25 receives the corresponding ridge 12 when the connecting member 20 is moved pivotably. The magnifying member 30 is moved pivotably to lay on the connecting member 20 so the ruler assembly can be folded to be a compact size.

Although the invention has been explained in relation to its preferred embodiment, it is to be understood that many other possible modifications and variations can be made without departing from the spirit and scope of the invention as hereinafter claimed.

What is claimed is:

1. A ruler assembly comprising:

a ruler having an upper surface to which two clamping means are disposed and two longitudinal sides, at least one of two sides of said ruler having at least one series of graduations defined thereon;

a connecting member having a first long edge and a second long edge said first long edge having two openings defined therein and each of said openings partly defined by a respective one of two rods forming a portion of said first long edge so as to be pivotably received in said two clamping means, said second long edge of said connecting member having at least one first curved lug and at least one second curved lug respectively extending therefrom in an opposite direction to the at least one first curved lug; and a magnifying member having a pivot connected to one of two sides thereof and a slot defined therein located next to said pivot so that said pivot is pivotally received between said first curved lug and said second curved lug which extends through said slot.

2. The ruler assembly as claimed in claim 1 wherein each of said clamping means includes two ridges extending from said upper surface in parallel with each other so as to define a receiving passage therebetween.

3. The ruler assembly as claimed in claim 1 wherein said ruler has a groove defined in said upper surface thereof and said connecting member has a flange extending from said first long edge thereof so as to be disengagably received in said groove.

4. The ruler assembly as claimed in claim 1 wherein said connecting member has a supporting flange extending laterally from said second long edge thereof so as to support said magnifying member when said magnifying member is pivoted in perpendicular to said connecting member.

* * * * *